United States Patent [19]

Matthiesen

[11] 4,189,063

[45] Feb. 19, 1979

[54] ICE DISPENSER

[76] Inventor: Ralph F. Matthiesen, 13005 Welcome Dr., San Antonio, Tex. 78233

[21] Appl. No.: 849,397

[22] Filed: Nov. 7, 1977

[51] Int. Cl.[2] .............................................. B65G 33/02

[52] U.S. Cl. .......................................... 222/1; 222/63; 222/77; 222/413; 222/459; 366/159; 177/116

[58] Field of Search .................. 222/1, 52, 63, 64, 66, 222/77, 412, 413, 547, 564, 459; 366/159; 177/116

[56] References Cited

U.S. PATENT DOCUMENTS

| | | | |
|---|---|---|---|
| 1,835,989 | 12/1931 | Hofft et al. | 222/459 X |
| 1,880,840 | 10/1932 | Currier | 222/413 X |
| 1,981,454 | 11/1934 | Kay | 222/66 X |
| 3,093,271 | 6/1963 | Douglas | 222/413 |
| 3,610,482 | 10/1971 | Van Steenburgh | 222/413 |
| 3,722,755 | 3/1973 | Nakashima | 222/413 |

*Primary Examiner*—Joseph J. Rolla
*Attorney, Agent, or Firm*—Clarence A. O'Brien; Harvey B. Jacobson

[57] ABSTRACT

A dispenser for crushed and cubed ice has a housing arranged forming an article containing chamber from which ice can be dispensed on demand through a discharge opening provided in the housing. A plurality of parallel, coextending screw conveyors are disposed within the chamber and disposed adjacent a floor thereof selectively moving ice toward the discharge opening of the housing without excavating the ice beneath the conveyors, with a baffle being disposed extending from adjacent the discharge opening for preventing bridging of ice within the chamber of the dispenser by causing part of the ice moved by the conveyors toward the discharge opening to orbit about the chamber. Operation of the conveyors can be controlled by a coin-actuated mechanism, and the like, in conjunction with a weighing scale on which the ice receiving receptacle can be disposed, and a suitable electrical circuit including a timer causing interruption of the circuit after a predetermined length of time in the event the weighing scale is lifted upwardly or is otherwise prevented from a normal downward movement as ice is being dispensed.

9 Claims, 5 Drawing Figures motors
timer (n.c.)
n.c.
n.c.
12
14
16
18
20
22
24
28'
30
32'
34
34'
34"
36
36'
36"
38
38'
38"
40'
42
44
46
48
50
52
54
56
58
60
62
64
66
68
70
72
74
76
78
80
82
84
86
88
90
92
94
96
B
C
S
3
4

ICE DISPENSER

BACKGROUND OF THE INVENTION

1. Field of the Invention

This invention relates generally to dispensers, and particularly to a dispenser for crushed and cubed ice which prevents bridging and freezing together of the ice within a storage bin or chamber of the dispenser.

2. Description of the Prior Art

It is well known that crushed and cubed ice, and all other similar types of fragmentary ice, will bridge and freeze together when stored in a bin, making it almost impossible to get the ice out of the bin when desired to dispense same in small amounts.

By "bridging" is meant that when a tunnel is excavated under the ice, such as commonly happens when only a single screw conveyor is employed to move the ice toward a discharge opening associated with the bin, the excavation will cause the rest of the ice to hold itself up and freeze together. The only way to release this bridge is to poke it with a suitable instrument, or to provide some sort of agitator within the bin. Such agitators are undesirable because they will break up the ice into small undesired pieces in the process of breaking up the bridge.

Examples of conventional ice dispenser construction can be found in U.S. Pat. Nos: 3,225,968, issued Dec. 28, 1965, to W. G. Winkler, et al.; 3,348,657, issued Oct. 24, 1967, to W. H. Hall, et al; and 3,570,720, issued Mar. 16, 1971, to R. W. Curry, III. These known ice dispensing devices employ one or more augers, or screw conveyors, to move ice from a storage area to a dispensing outlet, but all of these devices, however, work on the concept of breaking up bridged or clumped ice as it is being fed to the dispensing outlet. This manner of breaking up the bridged or clumped ice can result in damage to the discrete forms of the crushed or cubed ice as mentioned above.

SUMMARY OF THE INVENTION

It is an object of the present invention to provide an ice dispenser which eliminates bridging and clumping problems without the use of the conventionally employed agitators.

It is another object of the present invention to provide an ice dispenser which will dispense crushed or cubed ice evenly into a bucket or similar receptacle without damaging the discrete forms of the ice.

It is a still further object of the present invention to provide an ice dispenser which eliminates the problem of a tunnel being excavated under ice being conveyed from a storage area to a dispensing station.

Yet another object of the present invention is to provide an ice dispenser with a reliable control system for dispensing ice according to a predetermined weight, making possible efficient coin-operated ice dispensing systems.

These and other objects are achieved according to the present invention by providing a dispenser having: a hollow housing forming an article containing chamber and provided with a discharge opening communicating with the chamber; and a conveyor assembly arranged within the chamber of the housing for moving discrete articles disposed within the chamber toward the discharge opening for selective dispensing. The conveyor assembly preferably includes a plurality of longitudinally extending screw conveyors arranged in side-by-side relation within the chamber, and arranged extending longitudinally toward the discharge opening of the housing for moving discrete articles, such as crushed and cubed ice, toward the discharge opening. This plurality of screw conveyors is arranged adjacent to, but above, a lower surface or floor, of the chamber of the housing, and cooperate to prevent the excavation of a tunnel beneath the discrete articles while the screw conveyors are in operation so as to move the discrete articles within the chamber toward the aforementioned discharge opening provided in the housing.

Each of the screw conveyors advantageously has a continuous spiral flight, which flight has a shorter pitch portion disposed adjacent the discharge opening of the housing for providing a more even discharge of articles from the chamber. Each of the shorter pitch portions advantageously is received within a sleeve of generally mating diameter, with the plurality of separate sleeves thus formed, one to each of the screw conveyors, cooperating to form the discharge opening provided in the housing.

A baffle is disposed adjacent the discharge opening provided in the housing for diverting a portion of the discrete articles in excess of those dischargeable through the sleeves forming the discharge opening upwardly along an orbital path about the chamber of the housing. More specifically, the baffle includes a first baffle part and a second baffle part, with the first baffle part being arranged extending linearly away from the discharge opening at an acute angle thereto and upwardly toward a terminal end, and the second baffle part being curved from the terminal end of the first baffle part and extending away from the discharge opening upwardly and rearwardly of the chamber of the dispenser toward an end wall partially forming the chamber and being disposed opposite an end wall of the chamber disposed adjacent and extending upwardly from the discharge opening.

The conveyor assembly includes a control arrangement for starting the screw conveyors in response to a demand for articles from the chamber, and for subsequently stopping the screw conveyors when a, for example, predetermined weight of the articles has been dispensed. This control arrangement preferably includes an article weight receiving platform mounted on the housing outside of the chamber, but adjacent to the discharge opening, for substantially vertical movement relative to the housing. A resilient device is connected to the housing and to the platform for biasing the platform upwardly relative to the housing, while a normally closed switch is associated with the platform for being opened by a predetermined downward movement of the platform under the weight of articles being dispensed and in opposition to the bias of the resilient device.

The control arrangement further includes a pivotally mounted flap disposed within the chamber, and a further normally closed switch mounted on the housing and connected to the flap for being opened by a downward swinging movement of the flap, which swinging movement would indicate a predetermined low level of articles within the chamber.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
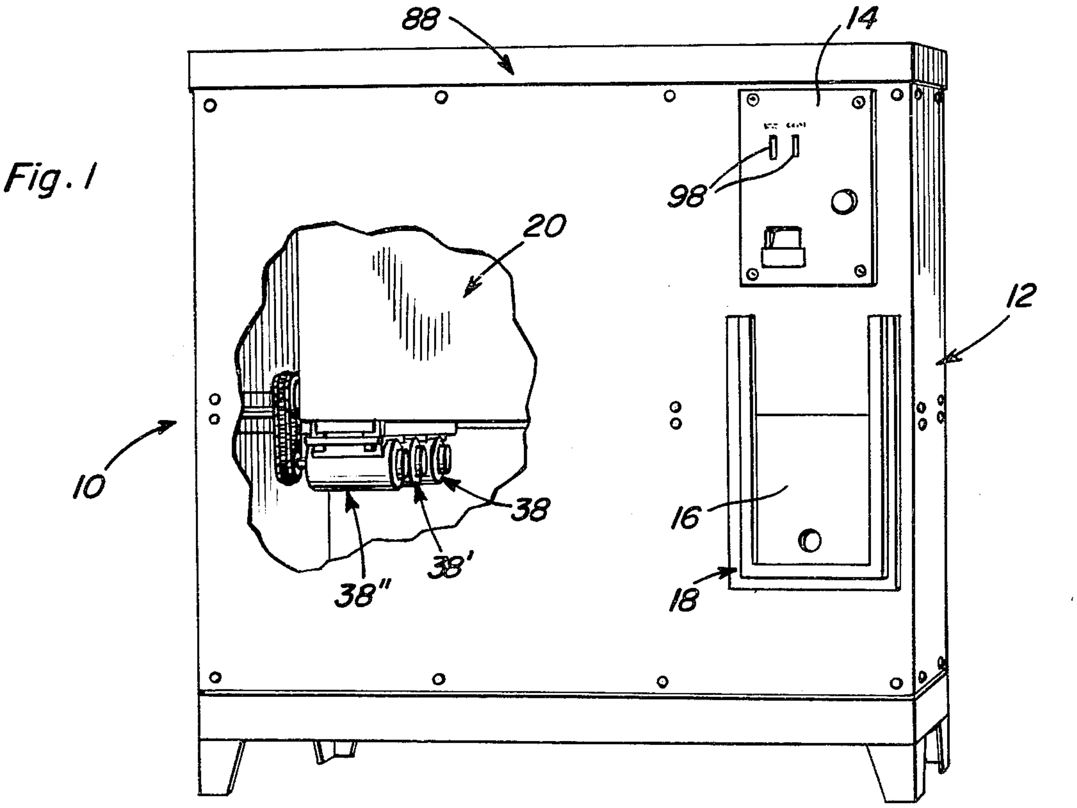
FIG. 1 is a schematic, perspective view showing an ice dispenser according to the present invention, the view being partly cut away to show portions of the interior of the device.
Figure 4:
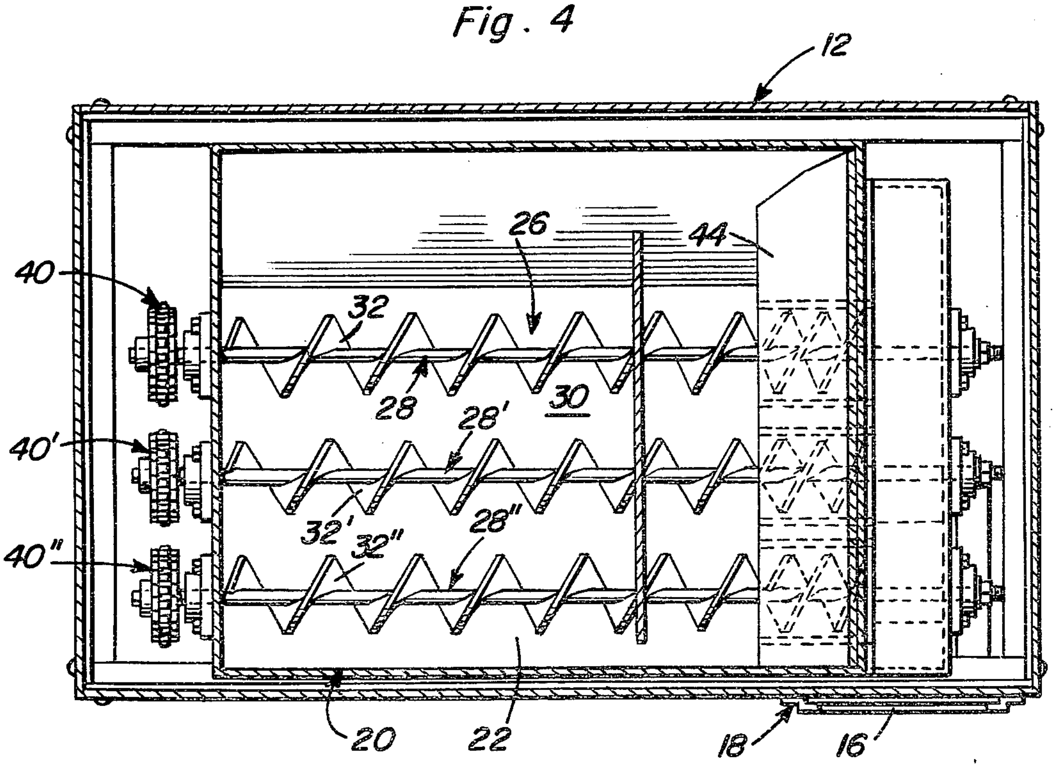
FIG. 4 is a sectional view taken generally along the line 4—4 of FIG. 2.

Referring now more particularly to FIGS. 1 through 4 of the drawings, a dispenser 10 according to the present invention includes a cabinet 12 of generally conventional construction and having provided thereon a control panel 14 specifically arranged for coin-operation of dispenser 10. Also provided on cabinet 12 is an access hatch 16 slidably disposed in a generally U-shaped guide 18 for permitting access to ice, and the like, dispensed by the device. A hollow housing 20 forming an article containing chamber 22 and provided with a discharge opening 24 communicating with chamber 22 is disposed within cabinet 12 by suitable connection. Arranged within chamber 22 of housing 20 is a conveyor assembly 26 for moving the crushed or cubed ice, or other discrete articles, disposed within chamber 22 toward the discharge opening 24.

Conveyor assembly 26 includes a plurality, three being illustrated, of longitudinally extending screw conveyors 28, 28' and 28" arranged in side-by-side relation coextensive one another and extending longitudinally toward the discharge opening 24 for moving the discrete articles toward opening 24. Screw conveyors 28, 28', 28" are arranged adjacent to a lower surface 30, or floor, of chamber 22 of housing 20 for preventing excavation of a tunnel beneath the crushed or cubed ice of other suitable discrete articles being dispensed.

Each of the screw conveyors 28, 28', 28" has a continuous spiral flight 32, 32', 32", which flight has a shorter pitch portion 34, 34', 34", respectively, disposed adjacent the discharge opening 24 of housing 20 for providing a more even discharge of articles from chamber 22. Opening 24 itself is formed by a plurality of sleeves 36, 36', 36", respectively associated with the screw conveyors 28, 28', 28", with the shorter pitch portions 34, 34', 34" of each of the screw conveyors 28, 28', 29" being disposed in a respective one of the sleeves 36, 36', 36" so that the sleeves shroud the shorter pitch portions of the screw conveyors.

Each of the screw conveyors 28, 28', 28" is individually actuated by a respective motor 38, 38', 38" connected directly to the associated screw conveyor by a drive train 40, 40', 40". Since the construction of the motors and the associated drive trains themselves is conventional and generally well known in the art, such construction will not be described in greater detail herein.

Figures 2, 3, 5:
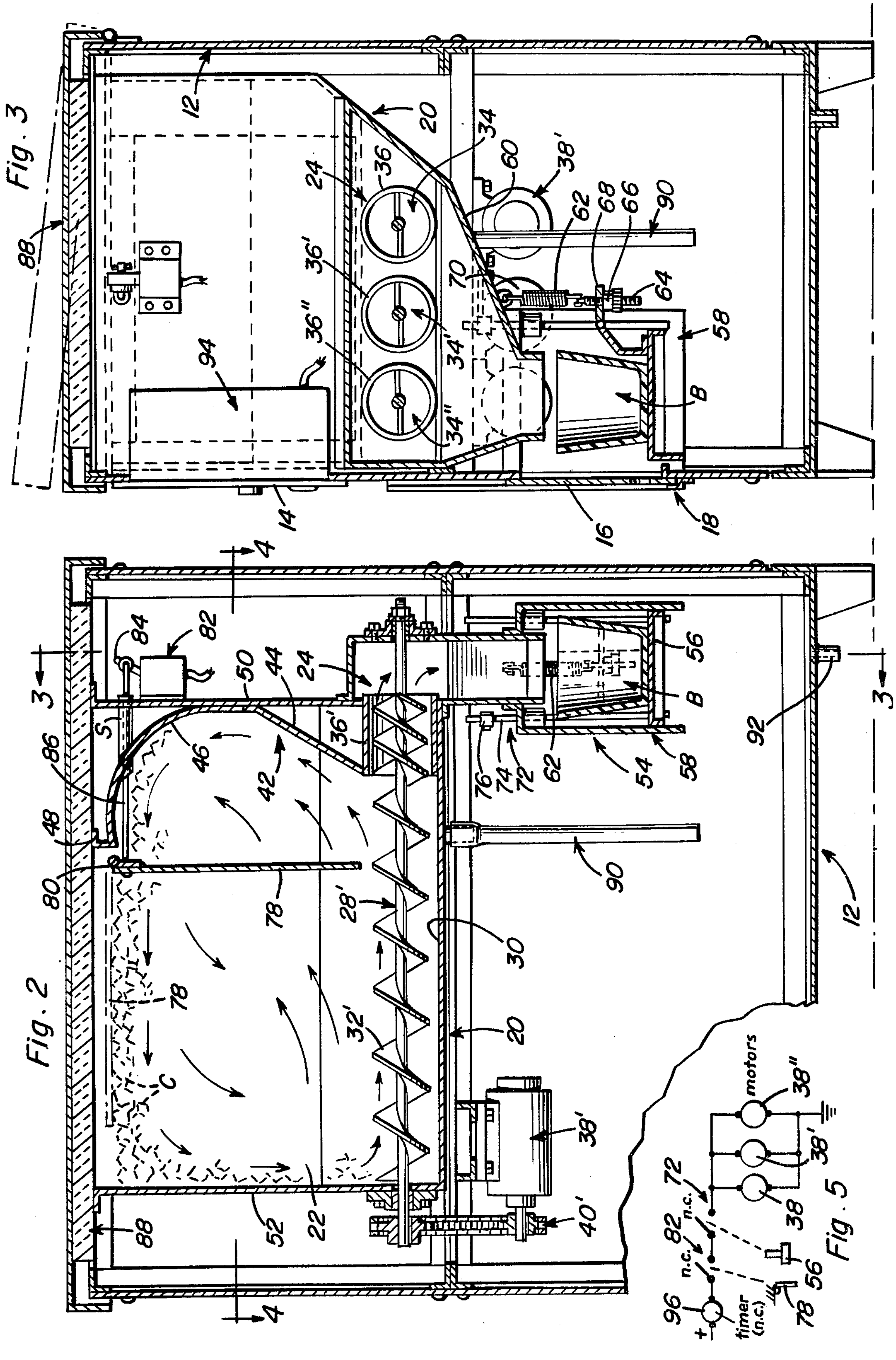
FIG. 2 is an enlarged, fragmentary, vertical, longtudinal sectional view of the ice dispenser shown in FIG. 1.
FIG. 3 is a sectional view taken generally along the line 3—3 of FIG. 2.
FIG. 5 is a schematic diagram of a control circuit for the dispenser of FIGS. 1–4.

Conveyor assembly 26 also includes a baffle 42 disposed adjacent discharge opening 24 for diverting articles C, such as ice (FIG. 2), in excess of those articles dischargeable through opening 24 along an orbital path, indicated by the flow arrows in FIG. 2, about chamber 22 of housing 20. More specifically, baffle 42 includes a first baffle part 44 and a second baffle part 46, with part 44 extending linearly away from discharge opening 24 and at an acute angle thereto, toward the direction of discharge of articles C, and upwardly toward a terminal end. Second baffle part 46 is curved from the terminal end of part 44 and away from discharge opening 24, and terminating in a lip 48 disposed rearwardly from the discharge opening 24 and an associated end wall 50 of housing 20 toward a rear end wall 52 of housing 20.

The conveyor assembly 26 further includes a control arrangement 54 provided for starting the screw conveyors 28, 28', 28" in response to a demand for articles C to be dispensed from chamber 22, and for subsequently stopping the screw conveyors 28, 28', 28", or more specifically the motors 38, 38', 38" thereof, whenever a, for example, predetermined weight of articles C has been dispensed from chamber 22.

Control arrangement 54 advantageously includes an article weight receiving platform 56 mounted on housing 20 outside of chamber 22, but adjacent to discharge opening 24, for substantially vertical movement relative to housing 20. More specifically, platform 56 is disposed for vertical sliding movement within a receptacle 58 provided within the interior of cabinet 12 and having one side thereof formed by a hole provided in a side wall of cabinet 12, about three sides of which hole guide 18 is arranged, and over which hole access hatch 16 is slidably disposed. A chute 60 having a long slope bottom wall connects the area of receptacle 58 with the output portion of discharge opening 24.

A resilient device in the form of a conventional helical coiled tension spring 62 is connected to housing 20, or more specifically chute 60, and to platform 56 for biasing platform 56 upwardly. A threaded rod 64 connected to one end of spring 62 cooperates with a nut 66 to permit adjustment of the deflection of spring 62, and therefore the amount of movement by platform 56 under a given quantity of articles disposed thereon, by engagement with a lug 68 mounted on receptacle 58. A lug 70 mounted on the bottom surface of chute 60 permits attachment of the other end of spring 62 to chute 60. Attached to receptacle 58 is a normally closed switch 72 which can be opened by relative movement of a pole 74 provided with a collar 76 and affixed to platform 56 for movement therewith. As can be readily understood, engagement of collar 76 with an actuating button of switch 72 will cause switch 72 to open after a predetermined amount of downward movement of platform 56. By proper selection and adjustment of spring 62, as well as adjustment of collar 76 on pole 74, the amount of weight which can be dispersed onto platform 56 from chamber 22 can be varied as desired.

Control arrangement 54 further includes a flap 78 substantially of a configuration corresponding to a transverse cross section of chamber 22, and affixed to a shaft 80 pivotally mounted on housing 20 so as to extend transversely across chamber 22 and pivot with respect to housing 20. A switch 82 is mounted on the outer surface of end wall 50 of housing 20, and is connected to flap 78 at a point spaced at least somewhat from the axis of shaft 80 by a crank 84 pivotally attached to a longitudinally extending bar 86. The latter is itself connected to flap 78 at a longitudinal end thereof spaced from the connection to crank 84, with bar 86 advantageously being slidably arranged in the illustrated sleeve S (FIG. 2) extending between end wall 50 and baffle part 46. As can be appreciated from the full and broken line showings of flap 78 in FIG. 2, when the amount of ice within chamber 22 has dropped such that flap 78 is permitted to swing from the broken line position to the full line position, normally closed switch 82 will be opened, thus interrupting operation of the system and stopping the conveyors 28, 28' and 28''.

Cabinet 12 is provided with a suitable, preferably insulated, cover 88 with a suitable drain pipe assembly 90 leading from the bottom of housing 20 and an appropriate drain 92 from the bottom of cabinet 12 itself. By this arrangement, cover 88 permits refilling of chamber 22, while pipe assembly 90 and drain 92 permit the water or other liquid resulting from melted ice, and the like, to drain downwardly first from housing 20 and subsequently from cabinet 12 for disposition as appropriate.

Referring now to FIG. 5 of the drawings, a suitable electrical circuit for the control arrangement 54 according to the invention is seen, which circuit can be incorporated into a conventional box construction, such as that designated 94 in FIG. 3, together with likewise conventional coin-operated mechanisms, and the like. As can be seen from FIG. 5, the electrical circuit preferably also includes a normally closed timer 96 arranged in parallel with the normally-closed switches 72 and 82 so as to interrupt the electrical circuit and cease dispensing operations in the event downward movement of platform 56 is stopped as by an obstruction placed within recesses 58 beneath platform 56, or by an unscrupulous user of dispenser 10 reaching a hand through the hole normally covered by access hatch 16 and applying force to platform 56 in order to prevent the downward movement thereof. Accordingly, timer 96 will automatically interrupt the dispensing operation after a predetermined time lapse which would normally be more than sufficient to permit the predetermined amount of weight of articles I to be dispensed.

In operation, a user (not shown) of a dispenser 10 can insert a coin or coins, tokens, or even paper money, and the like, into appropriate slots 98 provided on control panel 14. The coin-actuated mechanism (not shown) will close a switch (not shown) which will energize the electrical circuit shown on FIG. 5 and cause motors 38, 38', and 38'' to begin operation so as to rotate the respective screw conveyors 28, 28', and 28''. It will be appreciated that since the motors are connected in parallel to the conventional source of electrical energy, and the like, disablement of one of the motors for any reason will still permit the other motors to operate. The articles C will now be passed to the sleeves 36, 36', and 36'' and down chute 60 into a bucket B disposed on platform 56 within receptacle 58. As the articles C drop into bucket B, platform 56 will move downwardly until switch 72 is opened by engagement with collar 76, which opening of switch 72 can be seen to interrupt the electrical circuit to the motors 38, 38', and 38'' and stop the dispensing cycle. Further, in the event the quantity of articles C within chamber 22 falls below a predetermined value which permits flap 78 to swing downwardly to the full line position seen in FIG. 2, normally closed switch 82 will be opened to also interrupt the electrical circuit to the motors and shut the system down entirely. Finally, in the event the quantity of ice remains sufficiently high within chamber 22 to keep switch 82 in a closed position, and assuming that platform 56 is blocked from downward movement under the bias of articles C being dispensed so as to prevent switch 72 from being opened, timer 96 will after a suitable time lapse open and interrupt the electrical circuit to the motors 38, 38', and 38'' in order to stop the dispensing operation.

As can be readily understood from the above description and from the drawings, an ice dispenser according to the present invention will, because of the use of a plurality of side-by-side coextensive screw conveyors, prevent evacuation of ice, and the like, beneath the screw conveyors, and due to the use of baffle 42 cause some of the articles within the chamber to break up as they are inwardly deflected by the baffle 42 and move to the rear of the chamber in order to keep the discrete forms of ice loose and prevent them from bridging. Further, not only does the use of the plural screw conveyors prevent evacuation of ice, and the like, beneath the conveyors, but the use of the plural conveyors, especially with the shorter pitch portions at the discharge ends, will assure a smoother and more even delivery of articles to a bucket, and the like, which receives those articles being dispensed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A dispenser, comprising, a hollow housing forming an article containing chamber and provided with a discharge opening communicating with the chamber, conveyor means arranged within the chamber of the housing for moving discrete articles disposed within the chamber toward the discharge opening for dispensing the articles, said conveyor means including baffle means disposed adjacent the discharge opening of the housing for diverting articles, in excess of those dischargeable through the discharge opening, along an orbital path about the chamber of the housing in order to assure that the articles remain loose within the chamber, said baffle means including a first baffle part and a second baffle part, the first baffle part extending linearly away from the discharge opening at an acute angle thereto and toward a terminal end, and the second baffle part being curved from the terminal end of the first baffle part and extending away from the discharge opening and toward a surface of the chamber disposed opposite a surface of the chamber in which the discharge opening is provided.

2. A structure as defined in claim 1, wherein the conveyor means includes a plurality of longitudinally extending screw conveyors arranged in side-by-side relation and extending longitudinally toward the discharge opening for moving discrete articles toward the opening, the plurality of screw conveyors being arranged adjacent a lower surface of the chamber of the housing for preventing excavation of a tunnel beneath the discrete articles as the articles are being moved toward the discharge opening.

3. A structure as defined in claim 2, wherein each of the screw conveyors has a continuous spiral flight, which flight has a shorter pitch portion adjacent the discharge opening of the housing, the shorter flight portion providing a more even discharge of articles from the chamber.

4. A structure as defined in claim 3, wherein the discharge opening of the housing has a plurality of sleeves forming a like number of separate flow paths, one of the sleeves for each of the screw conveyors, with the shorter pitch portion of each of the screw conveyors being disposed in a respective one of the sleeves so as to be shrouded by the respective sleeve.

5. A structure as defined in claim 1, wherein the conveyor means includes control means for starting the conveyor means in response to a demand for articles from the chamber, and subsequently stopping the conveyor means when a predetermined quantity of the articles have been dispensed.

6. A structure as defined in claim 5, wherein the control means includes, in combination:

(1) an article weight receiving platform mounted on the housing outside of the chamber, but adjacent the discharge opening, for substantially vertical movement relative to the housing;

(2) resilient means connected to the housing and to the platform for biasing the platform upwardly; and (3) normally closed switch means connected to the platform for being opened by a predetermined downward movement of the platform against the bias of the resilient means and under the weight of articles being dispensed from the chamber of the housing.

7. A structure as defined in claim 6, wherein the control means further includes a pivotally mounted flap disposed within the chamber and extending transversely thereacross, and a further normally closed switch means mounted on the housing and connected to the flap for being opened by downwardly swinging movement of the flap to a position indicating a predetermined low level of articles within the chamber, the further normally closed switch means being connected to the conveyor means for deactivating the conveyor means and stopping dispensing operation of the dispenser whenever the further switch means is open.

8. A method for dispensing discrete chunks of ice from a chamber and maintaining the ice within the chamber loose, comprising the steps of:

(a) moving the ice in a first direction along a path adjacent the floor of the chamber at a first predetermined flow rate and toward a discharge passageway for discharging ice from the chamber through an opening;

(b) discharging ice from the chamber by conveying ice into and through said passageway at a second predetermined flow rate less than the first flow rate; and (c) diverting the excess moving ice represented by the difference between the first and second flow rates upwardly away from the passageway and in a direction generally opposite to the first direction for orbiting the excess ice about the chamber to maintain the discrete chunks of ice loose and preventing the ice from bridging and freezing together.

9. A hollow housing for discrete chunks of ice and including opposite sides, a bottom extending between said sides and a discharge passageway means in one of said sides, conveyor means in said housing for moving ice chunks at a first predetermined flow rate along a path adjacent said bottom and extending in a first direction toward said one side and said passageway, dispensing means for dispensing ice chunks from said housing by conveying ice into and through said discharge passageway at a second flow rate less than said first flow rate, and means operative to upwardly and rearwardly divert the excess portion of ice moved toward said one side by said conveyor means and represented by the difference between said first and second flow rates away from said discharge passageway and toward said other side, respectively, to thereby orbit the excess ice within the housing for maintaining the discrete chunks of ice loose and preventing the ice from bridging and freezing together.

* * * * *